(12) United States Patent  
Wieres

(10) Patent No.: US 7,823,764 B2
(45) Date of Patent: Nov. 2, 2010

(54) METHOD AND DEVICE FOR BRAZING MATERIAL APPLICATION, METHOD FOR PRODUCING A HONEYCOMB BODY, EXHAUST GAS TREATMENT UNIT AND VEHICLE

(75) Inventor: Ludwig Wieres, Overath (DE)

(73) Assignee: Emitec Gesellschaft Für Emissionstechnologie mbH, Lohmar (DE)

( * ) Notice: Subject to any disclaimer, the term of this patent is extended or adjusted under 35 U.S.C. 154(b) by 0 days.

(21) Appl. No.: 12/049,398

(22) Filed: Mar. 17, 2008

(65) Prior Publication Data

US 2008/0203140 A1 Aug. 28, 2008

Related U.S. Application Data

(63) Continuation of application No. PCT/EP2006/009007, filed on Sep. 15, 2006.

(30) Foreign Application Priority Data

Sep. 16, 2005 (DE) .................. 10 2005 044 499

(51) Int. Cl.
*B23K 31/02* (2006.01)
*B23K 101/02* (2006.01)

(52) U.S. Cl. .................. 228/181; 228/164; 228/174; 228/245; 29/890

(58) Field of Classification Search .................. 228/164, 228/165, 173.1, 173.6, 173.7, 174, 181, 245, 228/246, 253; 156/197; 29/890; 72/379.6
See application file for complete search history.

(56) References Cited

U.S. PATENT DOCUMENTS

| 3,037,592 A | * | 6/1962 | Shipley et al. ............. D25/141 |
| 4,381,590 A | * | 5/1983 | Nonnenmann et al. ........ 29/890 |
| 4,824,011 A | * | 4/1989 | Maus et al. ............... 228/173.7 |
| 4,863,895 A | * | 9/1989 | Behr ......................... 502/439 |
| 5,310,586 A | * | 5/1994 | Mullen ...................... 428/34.1 |
| 5,422,083 A | | 6/1995 | Sheller |
| 5,618,498 A | * | 4/1997 | Konya et al. ................ 422/174 |
| 5,971,255 A | * | 10/1999 | Yamamoto et al. ......... 228/181 |
| 6,841,135 B2 | | 1/2005 | Matsuoka |
| 2002/0129890 A1 | | 9/2002 | Staubwasser |
| 2007/0259198 A1 | * | 11/2007 | Althofer et al. ............. 428/553 |

FOREIGN PATENT DOCUMENTS

| DE | 3312944 A1 | * | 10/1984 |
| DE | 3726072 C2 | | 8/1989 |
| EP | 1 156 196 A2 | | 11/2001 |

OTHER PUBLICATIONS

International Search Report, dated Dec. 15, 2006.

* cited by examiner

*Primary Examiner*—Jessica L Ward
*Assistant Examiner*—Kevin E Yoon
(74) *Attorney, Agent, or Firm*—Laurence A. Greenberg; Werner H. Stemer; Ralph E. Locher

(57) ABSTRACT

A device and a method for applying brazing material to an at least partially structured metal foil include a) providing at least one flat metal foil, b) shaping the at least one metal foil to produce a structure, and c) applying brazing material to the at least one metal foil. Steps b) and c) are carried out discontinuously and at least partially together. The device and method are preferably used in the production of metallic honeycomb bodies for the treatment of exhaust gases in vehicles.

7 Claims, 3 Drawing Sheets

METHOD AND DEVICE FOR BRAZING MATERIAL APPLICATION, METHOD FOR PRODUCING A HONEYCOMB BODY, EXHAUST GAS TREATMENT UNIT AND VEHICLE

CROSS-REFERENCE TO RELATED APPLICATIONS

This is a continuation, under 35 U.S.C. §120, of copending International Application No. PCT/EP2006/009007, filed Sep. 15, 2006, which designated the United States; this application also claims the priority, under 35 U.S.C. §119, of German Patent Application DE 10 2005 044 499.7, filed Sep. 16, 2005; the prior applications are herewith incorporated by reference in their entirety.

BACKGROUND OF THE INVENTION

Field of the Invention

The present invention relates to a method for applying brazing material or hard solder to an at least partially structured metal foil. Methods for producing a honeycomb body, a device for applying brazing material, exhaust-gas treatment units and vehicles are also described. The invention is used, in particular, in the field of production of metallic exhaust-gas treatment units which are constructed with a plurality of at least partially structured metal foils.

In order to produce exhaust-gas treatment units of that type, the smooth and/or structured metal foils are stacked one on top of the other and are twisted or wound with one another and inserted into a housing. In order to provide a long service life in an exhaust system of a vehicle, it is necessary for technical joining connections between the metal foils themselves or between the metal foils and the housing to have a stable construction. Brazed or hard-soldered, sintered, and/or welded connections have been proven to be fundamentally suitable for that purpose.

Technical problems always occur during the application of the brazing material in connection with the brazing of ever further developed honeycomb bodies. For example, it must firstly be ensured that the brazing material is positioned precisely at points at which a technical joining connection is ultimately to be formed. However, it is also to be ensured that an excess accumulation of brazing material is avoided, since during the subsequent thermal treatment, undesired diffusion processes between the brazing material and the metallic components of the honeycomb body can occur, which can adversely affect the service life of the metal foil.

The supply of brazing material to the metal foils can already take place before the twisting or winding to form a honeycomb structure, for example by virtue of brazing material strips and/or brazing material pastes being applied. It is additionally known to provide the finished honeycomb structure with (in particular powdered) brazing material at the end side. Finally, it is also known to place brazing material on predetermined partial regions of the surface of the metal foils through the use of a so-called imprinting ("inkjet") process.

BRIEF SUMMARY OF THE INVENTION

It is accordingly an object of the invention to provide a method and a device for brazing material application, a method for producing a honeycomb body, an exhaust gas treatment unit and a vehicle, which overcome the hereinafore-mentioned disadvantages and at least partially solve the technical problems of the heretofore-known devices and methods of this general type and in which brazing material can be positioned on partial regions of metal foils in a precise manner which is also suitable for series production.

With the foregoing and other objects in view there is provided, in accordance with the invention, a method for applying brazing material to an at least partially structured metal foil. The method comprises:
  a) providing at least one flat metal foil;
  b) shaping the at least one metal foil to produce a structure;
  c) applying brazing material to the at least one metal foil; and
  carrying out steps b) and c) discontinuously and at least partially together.

In this case, a flat metal foil is often unrolled from a type of coil and the flat, smooth metal foil is subsequently provided with a structure. In this case, it is preferable for the metal foil to be shaped in such a way that it is provided entirely with a structure, with the structure preferably being formed as a corrugated, sinusoidal, rectangular, sawtooth-shaped or similar structure.

The brazing material is placed during the shaping of the metal foil or shortly after the shaping of the metal foil has taken place. In this case, steps b) and c) are carried out discontinuously so that, for example, the feed of the metal foil is not constant but slows its feed significantly or comes to rest intermittently. The shaping and the application of the brazing material are carried out during the rest period. In this case, the two steps are carried out at least partially together, in particular simultaneously. It is also possible for at least a part of the application of the brazing material to take place during the transport or during the supply, positioning, etc. of the metal foil with respect to the tool. In any case, steps b) and c) are performed spatially very close to one another, for example with a spacing in the direction of the metal foil of less than 100 structures, in particular less than 10 structures, such as for example between 1 and 5 structures. It is thereby possible under some circumstances to dispense with sensor monitoring of the position of the applied brazing material, as is necessary if the metal foil is unguided over a relatively great distance.

The combination of the two steps b) and c) results in a synchronization of these working steps. It is thereby possible for the first time to dispense with an application of brazing material with a separate working step, as has heretofore been conventional. At the same time, it is possible through the use of a very precise application of brazing material to precisely predetermine the type of connections and to therefore also ensure a minimum consumption of brazing material.

In accordance with another mode of the method of the invention, step b) includes shaping through the use of reciprocating punching with a clock frequency, with step c) being carried out with the same clock frequency. During reciprocating punching, the flat metal foil is passed through between a die and a stamp, with the structure being formed in the metal foil as the stamp penetrates into the die. For this purpose, a reciprocating movement which predefines a clock frequency is often necessary. In this case the clock frequency is, for example, 100 to 800 Hertz (Hz, 1/s), in particular in a range from 400 to 600 Hz, for metal foils with a thickness of less than 0.15 millimeters (mm).

The synchronization of steps b) and c) takes place in this case through the use of the clock frequency. Accordingly, during the production of a certain number of structure elements (for example corrugation sections), an equal number of partial regions (for example corrugation sections) of the metal foil are therefore advantageously provided with brazing material. Since the time for producing the structure is required in any case and the application of brazing material takes place simultaneously, the production process of honeycomb bodies is, for example, also shortened in relation to known methods.

In accordance with a further mode of the method of the invention, step b) and step c) are carried out in a manner mechanically coupled to one another. For this purpose, mechanically coupled tools are preferably used, in particular in the manner of a so-called follow-on tool. Even if this has been selected in this case as a preferred variant with regard to costs, the two steps can also be performed in a combined manner through the use of electronic circuits, software and the like.

In accordance with an added mode of the method of the invention, it is particularly advantageous for step c) to include the provision of brazing material foil, and the step of separating brazing material labels from a brazing material foil is, in particular, also included, in order to generate a plurality. In this way, it is possible to provide precisely apportioned brazing material labels, which include the quantity of brazing material precisely predetermined for the partial region. Brazing material labels of this type are easy to handle, and in addition, the brazing material foil can be particularly well utilized for the provision of brazing material labels of this type. In one preferred application, such as in the production of catalyst carrier bodies, brazing material labels are used which have dimensions in the range of from 1 mm in width and up to 5 mm in length, wherein, per brazing material label, often at most approximately 1 gram (g) of brazing material is applied so as to be aligned positionally accurately with respect to the structure.

In accordance with an additional mode of the method of the invention, it is also advantageous for step c) to follow the application of brazing material foil through the use of at least one of adhesive bonding and welding processes. A type of pre-fixing of the brazing material foil or of the brazing material label is therefore given. In the case of adhesive bonding, the adhesive can be provided on one side of the brazing material foil or of the brazing material label and/or on the metal foil. In the case of welding, a laser is preferably used. With such pre-fixing, it is ensured that the brazing material foil does not move from the desired position during the formation of the honeycomb body, in which the metal foils slide on one another.

In accordance with yet another mode of the method of the invention, the at least one metal foil is generated with a corrugated structure with elevations and depressions, with the brazing material being applied from at least one side of the at least one metal foil to a plurality of partial regions of the elevations or depressions. In this case, the elevations and depressions are formed preferably over the entire width of the metal foil. In addition, the elevations can be provided with pockets, vanes, turned-out portions, etc., with it also, for example, being possible for the pockets to serve as a reservoir for applied brazing material. The metal foil is preferably provided with brazing material from both sides, in particular simultaneously. The partial regions are preferably positioned close to an edge or what will later be an end side of the honeycomb body. In addition, it is also possible for brazing material to be applied to other, inner partial regions of the metal foil.

With the objects of the invention in view, there is also provided a method for producing a honeycomb body. The method comprises carrying out the method for applying brazing material according to the invention, placing the brazing material in contact with sections of at least one metal foil to form at least one honeycomb structure, fixing the at least one honeycomb structure, and brazing the at least one honeycomb structure.

With regard to the working steps which follow the brazing material application, it is to be noted that the brazing material can be placed in contact with, for example, unbrazed partial sections of the same metal foil or of another, if appropriate smooth metal foil. In this case, contact of the metal foil sections against one another with a certain preload is desirable. The fixing and if appropriate preloading of the honeycomb structure formed when contact is made can take place through the use of separate tools and/or through the use of a housing disposed around the honeycomb structure. It is thereby ensured that, for subsequent transport of the honeycomb structure to an oven in which the brazing is carried out, the position of the brazing material with respect to the adjacent metal foil remains unchanged.

With the objects of the invention in view, there is furthermore provided a device for applying brazing material to an at least partially structured metal foil. The device comprises at least one foil supply for supplying at least one flat metal foil, at least one shaping unit for discontinuously producing a structure in the at least one metal foil, at least one positioning unit for discontinuously applying brazing material to the at least one metal foil, and a synchronizing device for coordinating movements of the at least one shaping unit and the at least one positioning unit. The device is suitable, in particular, for carrying out a method for applying brazing material as described above according to the invention.

The foil supply can, for example, include conveyer belts, gearwheels or toothed racks, guide rails and the like, but need not strictly be an integral component of the shaping unit and/or of the positioning unit. The shaping unit preferably means a bending or punching system in which certain partial sections of the flat metal foil are intermittently provided with a structure. This means, in particular, not continuously operating rolling systems with rolling wheels which engage into one another.

The positioning unit advantageously applies the brazing material with the same clock frequency as the shaping unit forms the structure into the at least one metal foil. The synchronizing device can also include parts of a controller, software, a regulating circuit or a data processing system.

In accordance with another feature of the invention, it is preferable for the synchronizing device to include a mechanical coupling device. The mechanical coupling device acts both on the shaping unit as well as on the positioning unit, so that a synchronized movement of the two units is ensured. This has the result that the application of brazing material is, with relatively little technical expenditure, carried out during the production of the structure, which leads to a precise application of brazing material in a shortened time.

In accordance with a further feature of the invention, it is also preferable for at least one adhesive bonding device or one welding device for applying the brazing material to be provided in the device. An embodiment of the device which alternatively has an adhesive bonding device or a welding device will often be sufficient. Under some circumstances, however, a combination of the two devices is also expedient. The brazing material is pre-fixed to the metal foil through the use of the adhesive bonding device or the welding device, so that the brazing material no longer changes its position with respect to the metal foil during subsequent transport.

In accordance with another feature of the invention, the at least one shaping unit is a reciprocating punching system and the synchronizing device brings about a common movement of the reciprocating punching system and the positioning unit.

In this case, it is preferable for the reciprocating punching system and the positioning unit to perform a translatory movement, in particular a reciprocating movement, towards the metal foil, with the movement being performed simultaneously.

With the objects of the invention in view, there is also provided an exhaust-gas treatment unit, comprising at least one honeycomb body produced by the method according to the invention or produced by the device according to the invention.

With the objects of the invention in view, there is concomitantly provided a vehicle, comprising at least one exhaust-gas treatment unit according to the invention. Considerable time and cost advantages are therefore obtained in the field of series production of mobile exhaust systems.

Other features which are considered as characteristic for the invention are set forth in the appended claims, noting that the features listed individually in the claims can be combined with one another in any desired technologically expedient manner and highlight further embodiments of the invention.

Although the invention is illustrated and described herein as embodied in a method and a device for brazing material application, a method for producing a honeycomb body, an exhaust gas treatment unit and a vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
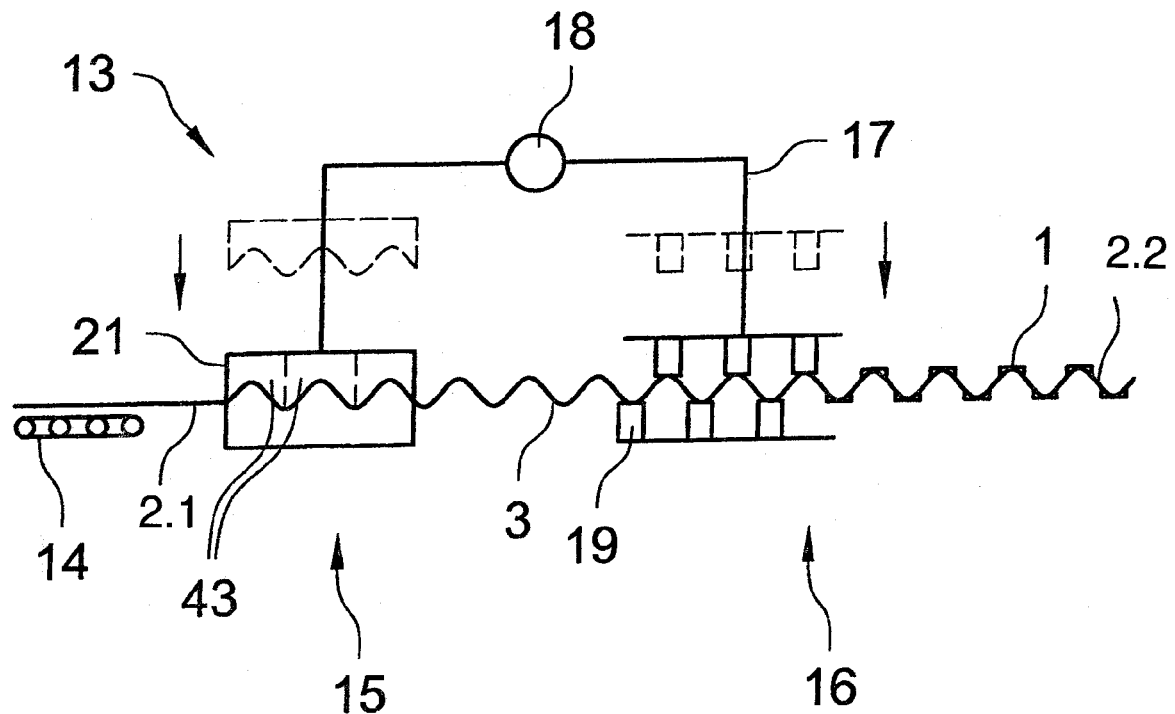
FIG. 1 is a schematic and diagrammatic view of a device for applying brazing material.

Referring now to the figures of the drawings in detail and first, particularly, to FIG. 1 thereof, there is seen a schematic and diagrammatic illustration of a device 13 for applying brazing material or hard solder, which includes a foil supply 14 embodied as a conveyer belt, through the use of which a smooth metal foil 2.1 is moved towards a shaping unit 15. A structure 3 is formed in the smooth metal foil 2.1 to produce a structured metal foil 2.2 through the use of the shaping unit 15, which is embodied herein as a reciprocating punching system 21. For this purpose, the reciprocating punching system 21 performs a reciprocating movement as indicated by a dashed starting position and an arrow. In this case, the reciprocating punching system 21 is formed with a plurality of stamps 43, which operate regularly offset in terms of time during one shaping step. It is, for example, preferable for the stamp 43, which adjoins the last structure 3 to begin, and for the stamps 43 which bear against it, to subsequently perform shaping individually. It is thereby ensured that sufficient material of the smooth metal foil 2.1 can be pulled into the reciprocating punching system 21 for the shaping process.

Directly thereafter, the metal foil 2.2, which is provided with the structure 3, passes to a positioning unit 16. As has been indicated by dashed lines and an arrow, the positioning unit 16 performs the same reciprocating movement, which is effected with the aid of a synchronizing device 17. In the embodiment variant illustrated herein, the synchronizing device 17 includes a coupling device 18. An application of brazing material 1 to the structured metal foil 2.2 is carried out at the same time as pre-fixing of the brazing material 1 through the use of an adhesive bonding device 19. The structured metal foil 2.2, which is provided with brazing material, can subsequently be transported for further processing.

Figure 2:
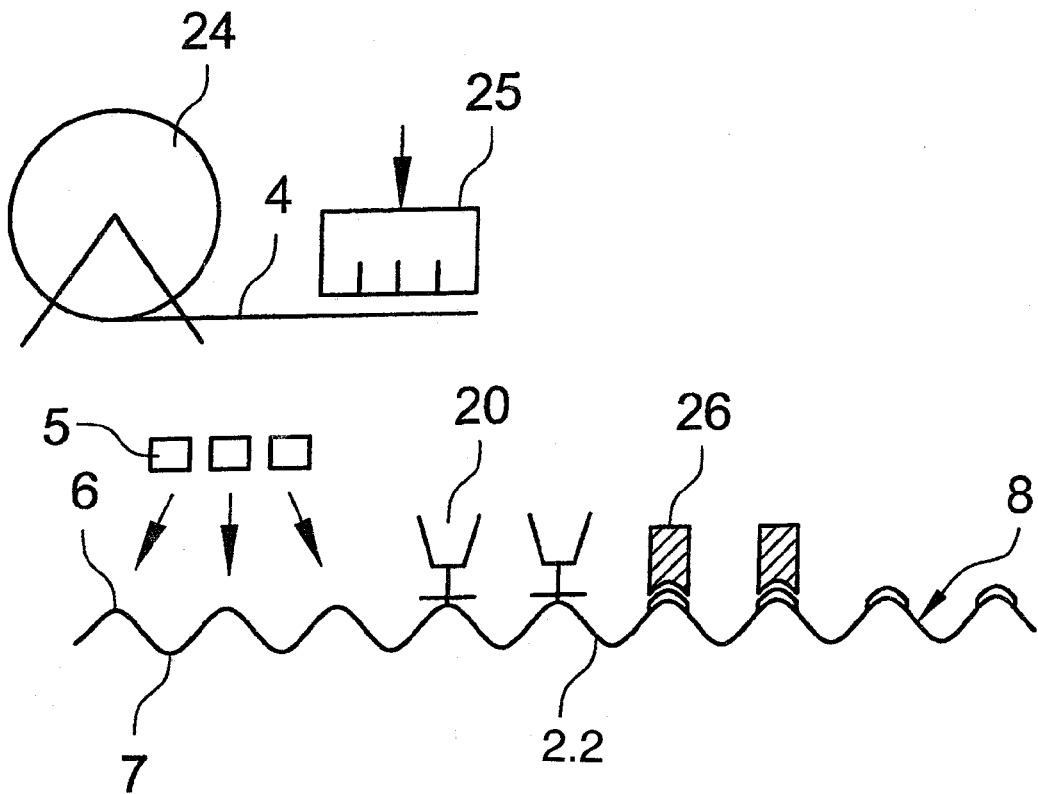
FIG. 2 is a schematic and diagrammatic view of a portion of the device for applying brazing material.
Figure 3:
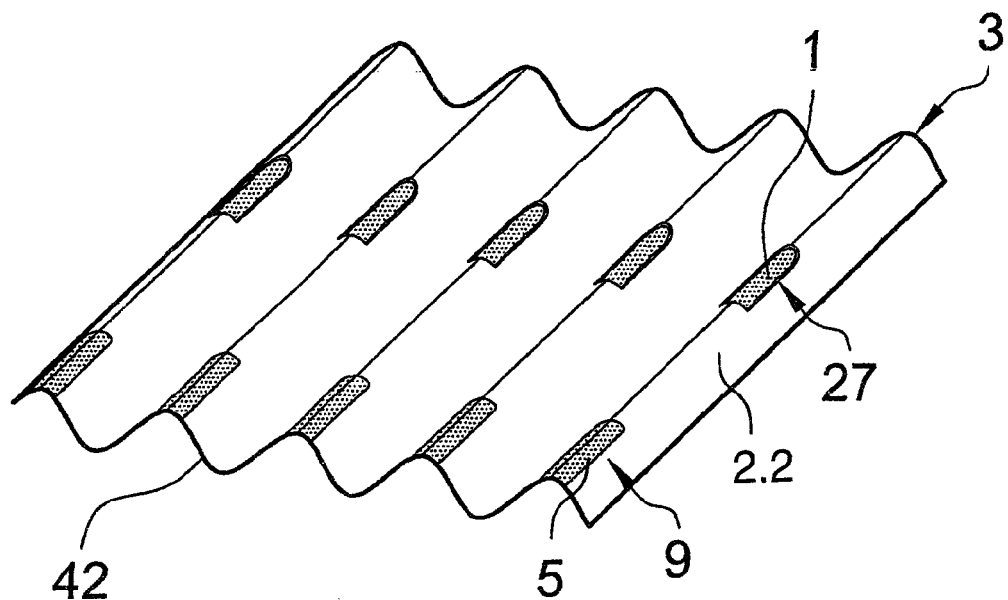
FIG. 3 is a perspective view of a structured metal foil provided with brazing material.

FIG. 2 shows how the brazing material is prepared and supplied to the structured metal foil 2.2. In this case, the brazing material is provided as a brazing material foil 4, which is unrolled from a coil 24. The brazing material foil 4 is subsequently supplied to a separating tool 25 which generates a plurality of brazing material labels 5 from the brazing material foil 4. The brazing material labels 5 correspond, for example, precisely to the brazing material quantity which is required for connecting individual elevations 6 or depressions 7 of the structured metal foil 2.2. The brazing material labels 5 are thus supplied to the elevations 6 from one side 8 of the structured metal foil 2.2 and are subsequently pre-fixed to the depressions 7 through the use of a welding device 20. The brazing material labels 5 are subsequently matched through the use of a pressing tool 26 to the structure of the corrugated or structured metal foil 2.2, so that the brazing material labels 5 substantially nestle against the elevations 6 or depressions 7. It is to be pointed out that the steps of attaching, pre-fixing and pressing can, under some circumstances, be carried out partially simultaneously using one tool. FIG. 3 is a perspective illustration showing a structured metal foil 2.2 with a structure 3 and brazing material labels 5 having been positioned in predetermined partial regions 9. In this case, first partial regions 9 are positioned close to an edge 42 of the structured metal foil 2.2. In addition, brazing material 1 is likewise applied in inner partial regions, which are formed in this case with recesses or pockets 27. The use of recesses 27 of this type ensures that the brazing material 1 (for example also in the event of contact of the structured metal foil 2.2 against a metal foil which slides on the latter) remains in the desired partial regions, so that it is possible in this case, if appropriate, to dispense with pre-fixing.

Figure 4:
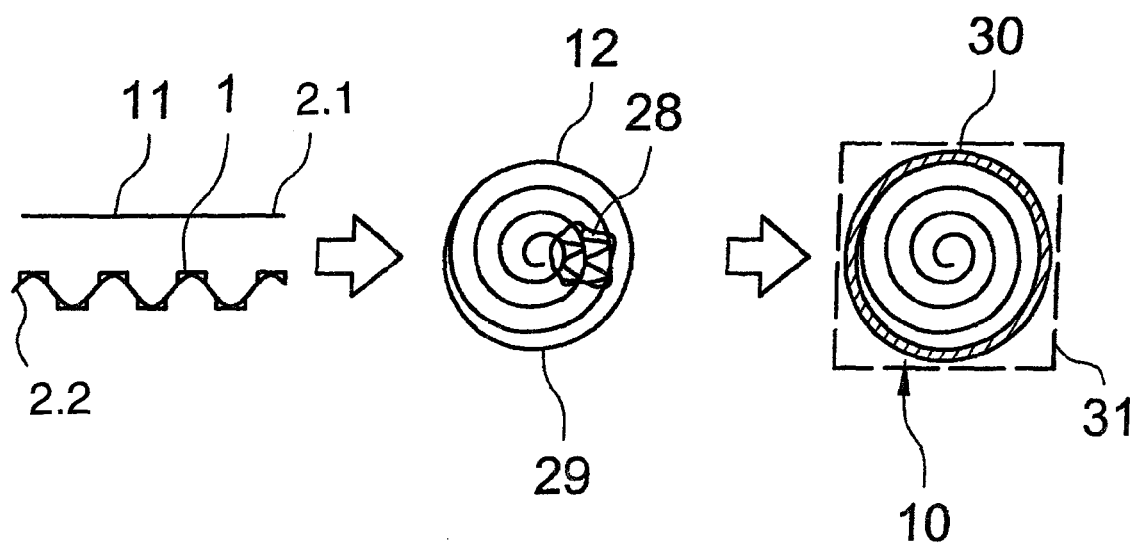
FIG. 4 is a schematic and diagrammatic view illustrating a method for producing a honeycomb body.

FIG. 4 shows the production of a honeycomb body 10, which is constructed in the manner of a spiral with a smooth metal foil 2.1 and a structured metal foil 2.2. It is fundamentally to be noted that other types of honeycomb bodies 10 can be produced in this way, for example in which the metal foils 2.1, 2.2 are firstly stacked and are subsequently twisted in an involute shape or S-shape. In the embodiment variant shown herein, the smooth metal foil 2.1 is thus placed onto the structured metal foil 2.2 in such a way that brazing material 1 which is positioned at the elevations and depressions comes into contact with sections 11 of the smooth metal strip or foil 2.1. The layer is subsequently wound in a spiral shape, so that, as illustrated herein, a cylindrical honeycomb structure 12 is formed. The honeycomb structure 12, which is viewed in this case from an end side 29, forms substantially axially running parallel channels 28 with the smooth and the structured metal foil 2.1, 2.2. The honeycomb structure 12 is now inserted into a housing 30, which serves for fixing. In addition, the housing 30 can likewise be provided with brazing material, so that during a subsequent thermal treatment in an oven 31 (for example at over 1000° C. and under a vacuum), technical joining connections are formed between the metal foils 2.1, 2.2 and the housing 30 and between the metal foils 2.1, 2.2 themselves.

Figure 5:
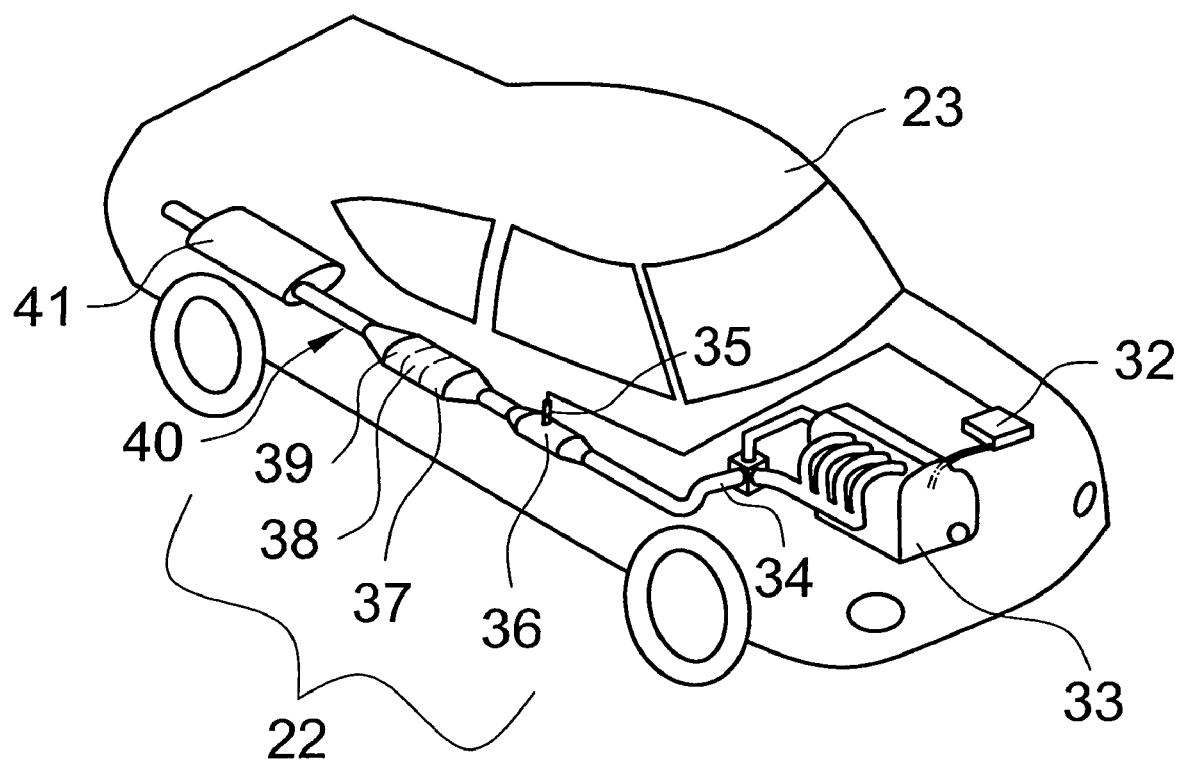
FIG. 5 is a perspective view of a vehicle including an exhaust-gas treatment unit.

FIG. 5 shows a particularly preferred field of use of honeycomb bodies 10 of this type as an exhaust-gas treatment unit 22. A vehicle 23 is shown which includes an internal combustion engine 33 that is operated through the use of an engine controller 32. The engine controller 32 can, for example, influence the operating mode of the internal combustion engine 33, taking into consideration measuring sensors 35 which are installed in an exhaust system 40. Exhaust gas generated by the internal combustion engine 33 is supplied through an exhaust line 34 to a plurality of the exhaust-gas treatment units 22 which all have a corresponding metallic honeycomb body 10. As is seen in a flow direction of the exhaust gas, the exhaust gas flows firstly through an oxidation catalytic converter 36, then a particle trap 37, an adsorber 38 and a further catalytic converter 39. The exhaust gas finally flows through a muffler 41 before it is discharged, in a purified condition, to the environment.

Through the use of the invention proposed herein, it is possible for the brazing material to be applied without a separate working step, with targeted application for a precisely predetermined brazing pattern and a minimal use of brazing material being obtained at the same time. This leads to a considerable time and cost benefit within the context of series production of metallic exhaust-gas treatment units for motor vehicles.

The invention claimed is:

1. A method for producing a honeycomb body for an exhaust gas treatment unit, the method comprising the following steps:

applying brazing material to an at least partially structured metal foil by:
 a) providing at least one flat metal foil;
 b) shaping the at least one metal foil to produce a structure by reciprocating punching with a clock frequency;
 c) applying brazing material to the at least one metal foil with the same clock frequency as the shaping of the at least one metal foil; and
 carrying out steps b) and c) discontinuously and at least partially together;

placing the brazing material in contact with sections of at least one metal foil before twisting or winding the at least one metal foil to form at least one honeycomb structure of the honeycomb body of the exhaust gas treatment unit;

fixing the at least one honeycomb structure; and
brazing the at least one honeycomb structure.

2. The method according to claim 1, which further comprises mechanically coupling step b) and step c) to one another.

3. The method according to claim 1, which further comprises providing brazing material foil in step c).

4. The method according to claim 1, which further comprises separating brazing material foil to produce a plurality of brazing material labels in step c).

5. The method according to claim 1, which further comprises carrying out step c) by applying brazing material foil with at least one process selected from the group consisting of adhesive bonding and welding.

6. The method according to claim 1, which further comprises:

producing the structure in the at least one metal foil as a corrugated structure with elevations and depressions; and applying the brazing material from at least one side of the at least one metal foil to a plurality of partial regions of the elevations or depressions.

7. The method according to claim 6, wherein the depressions are reservoir pockets, and the brazing material is applied simultaneously to a plurality of end-side partial regions of the elevations or depressions.

* * * * *